(12) United States Patent
Uchida et al.

(10) Patent No.: US 7,568,337 B2
(45) Date of Patent: Aug. 4, 2009

(54) DEVICE FOR DETECTING STATE OF THERMAL DEGRADATION OF EXHAUST PURIFYING CATALYST

(75) Inventors: Takahiro Uchida, Toyota (JP); Atsushi Morikawa, Toyota (JP); Tatsumasa Sugiyama, Anjyo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 468 days.

(21) Appl. No.: 11/399,433

(22) Filed: Apr. 7, 2006

(65) Prior Publication Data
US 2006/0225410 A1 Oct. 12, 2006

(30) Foreign Application Priority Data
Apr. 8, 2005 (JP) .............................. 2005-112870

(51) Int. Cl.
*F01N 3/00* (2006.01)
(52) U.S. Cl. .............................. 60/276; 436/37; 422/83
(58) Field of Classification Search ............... 423/447.1
See application file for complete search history.

(56) References Cited

U.S. PATENT DOCUMENTS 6,797,517 B1 * 9/2004 Hoshi et al. .................. 436/37

2004/0000135 A1 * 1/2004 Uchida ......................... 60/277

FOREIGN PATENT DOCUMENTS

| EP | 0 786 586 A2 | 7/1997 |
| JP | 7-119447 | 5/1995 |

* cited by examiner

*Primary Examiner*—Melvin C Mayes
*Assistant Examiner*—Smita Patel
(74) *Attorney, Agent, or Firm*—Oblon, Spivak, McClelland, Maier & Neustadt, P.C.

(57) ABSTRACT

An electronic controller integrates a rate of progress dK of thermal degradation of exhaust purifying catalyst at every predetermined time period, to calculate degree of thermal degradation K of the exhaust purifying catalyst, when the state of thermal degradation of the exhaust purifying catalyst is to be detected. By comparing the degree of thermal degradation K with a defect determining value S, whether the exhaust purifying catalyst is defective because of thermal degradation or not is determined. In calculating the degree of thermal degradation K, the electronic controller calculates the rate of progress dK of thermal degradation in the predetermined time period based on the integrated value of rate of progress dK of thermal degradation up to the last time (degree of thermal degradation K) and on the temperature T of exhaust purifying catalyst at that time, and adds the same to the integrated value up to the last time.

9 Claims, 3 Drawing Sheets

S··· DEFECT DETERMINING VALUE
T··· CATALYST TEMPERATURE

DEVICE FOR DETECTING STATE OF THERMAL DEGRADATION OF EXHAUST PURIFYING CATALYST

This nonprovisional application is based on Japanese Patent Application No. 2005-112870 filed with the Japan Patent Office on Apr. 8, 2005, the entire contents of which are hereby incorporated by reference.

BACKGROUND OF THE INVENTION

1. Field of the Invention

The present invention relates to a device for detecting a state of thermal degradation of an exhaust purifying catalyst, detecting a state of degradation caused by heat, of an exhaust purifying catalyst arranged in an exhaust passage of an internal combustion engine for purifying exhaust gas.

2. Description of the Background Art

An exhaust purifying catalyst such as an NOx catalyst used for an internal combustion engine gradually degrades by heat through use, and its exhaust purifying function lowers. Therefore, it is important to exactly ascertain the state of thermal degradation of the exhaust purifying catalyst and to address any problem promptly.

For this purpose, various techniques for detecting any defect caused by thermal degradation of exhaust purifying catalyst have been conventionally proposed. In one such approach, rate of progress of thermal degradation (amount of thermal degradation per unit time) of the exhaust purifying catalyst is found, which is integrated for a predetermined time period to calculate the degree of thermal degradation, and presence/absence of any defect caused by thermal degradation is detected based on the degree of thermal degradation. In the technique disclosed in Japanese Patent Laying-Open No. 7-119447, p. 4 and FIGS. 3 and 4, noting the fact that the rate of progress of thermal degradation differs dependent on the temperature of exhaust purifying catalyst, the temperature of exhaust purifying catalyst is detected in every predetermined time period, and a degradation coefficient (rate of progress of thermal degradation) corresponding to the detected temperature is found from a map. In the map, when the temperature of exhaust purifying catalyst is in a relatively low temperature range, the degradation coefficient is set at a constant value regardless of the temperature. In a temperature range higher than that mentioned above, the degradation coefficient is set to increase in proportion to the increase of temperature of the exhaust purifying catalyst. The degradation coefficient found in this manner is integrated for every predetermined time period, and when the integrated value (degree of thermal degradation) exceeds a predetermined value, it is determined that the exhaust purifying catalyst is thermally degraded and defective.

The rate of progress of thermal degradation of exhaust purifying catalyst tends to be large when thermal degradation is not much developed (degree of thermal degradation is small) and to become smaller as thermal degradation proceeds (degree of thermal degradation increases), when the temperature of exhaust purifying catalyst is constant. Such a tendency might come from the following phenomenon. In the exhaust purifying catalyst, a large number of catalyst grains of noble metal are provided on a carrier, and the exhaust purifying performance varies in accordance with surface area of the catalyst. The exhaust purifying performance lowers as the surface area becomes smaller.

When the exhaust purifying catalyst is continuously exposed to high heat, catalyst grains come to adhere with each other. Such adhesion leads to reduced surface area. In other words, thermal degradation of exhaust purifying catalyst proceeds, and catalyst purifying performance degrades gradually.

When the thermal degradation is not much developed (degree of thermal degradation is small), grain size of each catalyst grain is small, and therefore, there is much margin for adhesion of catalyst grains to each other. Therefore, when exposed to high heat, large number of catalyst grains come to adhere to each other, so that the surface area decreases significantly. Specifically, thermal degradation of exhaust purifying catalyst proceeds at a high rate of progress. The margin for adhesion of catalyst grains to each other becomes smaller as thermal degradation proceeds (degree of thermal degradation increases). When thermal degradation has developed to some extent, the degree of surface area reduction becomes smaller than when thermal degradation is not much developed. In other words, thermal degradation of exhaust purifying catalyst proceeds at a lower rate of progress than when thermal degradation is not much developed. When development of thermal degradation reaches a certain point, change (reduction) in surface area practically stops.

As described above, the rate of progress of thermal degradation of the exhaust purifying catalyst has such a characteristic that it becomes smaller as the degree of thermal degradation becomes higher. Such a tendency is observed even when the temperature of exhaust purifying catalyst varies.

In Japanese Patent Laying-Open No. 7-119447, such a characteristic is not considered, and assuming that the rate of progress of thermal degradation is constant as long as the temperature of exhaust purifying catalyst is constant regardless of the degree of thermal degradation, the degradation coefficient corresponding to the temperature of exhaust purifying catalyst at that time (rate of progress of thermal degradation) is integrated for every predetermined time period. Therefore, there is still room for improvement for exactly ascertaining the degree of thermal degradation of the exhaust purifying catalyst.

SUMMARY OF THE INVENTION

An object of the present invention is to provide a device for detecting a state of thermal degradation of an exhaust purifying catalyst, which can exactly ascertain the degree of thermal degradation of exhaust purifying catalyst and can improve accuracy in detecting a state of thermal degradation of exhaust purifying catalyst.

Measures to attain the above-described object and functions and effects thereof will be described in the following.

The present invention provides a device for detecting a state of thermal degradation of an exhaust purifying catalyst, including: a degree of thermal degradation calculating unit calculating a degree of thermal degradation of the exhaust purifying catalyst by integrating a rate of progress of thermal degradation of the exhaust purifying catalyst at every predetermined time period; and a determining unit determining the state of thermal degradation of the exhaust purifying catalyst based on the degree of thermal degradation calculated by the degree of thermal degradation calculating unit; wherein for calculating the degree of thermal degradation, the degree of thermal degradation calculating unit calculates the rate of progress of thermal degradation in the predetermined time period based on an integrated value of the rate of progress of thermal degradation up to the last time and based on temperature of the exhaust purifying catalyst at that time, and adds the calculated rate of progress of thermal degradation to the integrated value up to the last time.

According to this arrangement, in the degree of thermal degradation calculating unit, the rate of progress of thermal degradation of exhaust purifying catalyst (amount of thermal degradation per unit time) is integrated at every predetermined time period, whereby the degree of thermal degradation of exhaust purifying catalyst is calculated. The determining unit determines the state of thermal degradation of exhaust purifying catalyst based on the degree of thermal degradation calculated by the degree of thermal degradation calculating unit.

Here, the rate of progress of thermal degradation tends to differ in accordance with the degree of thermal degradation, in addition to the temperature of exhaust purifying catalyst. In this regard, according to the present invention, when the rate of progress of thermal degradation is integrated by the degree of thermal degradation calculating unit, based on the integrated value of the rate of progress of thermal degradation up to the last time, that is, the degree of thermal degradation calculated last time, and on the temperature of exhaust purifying catalyst at that time, the rate of progress of thermal degradation in the predetermined time period is calculated. The rate of progress of thermal degradation is added to the integrated value up to the last time (degree of thermal degradation calculated last time), and the value after the addition is regarded as the degree of thermal degradation of exhaust purifying catalyst up to the present time. Therefore, as compared with integration of the rate of progress of thermal degradation calculated based solely on the temperature of exhaust purifying catalyst, the degree of thermal degradation of exhaust purifying catalyst can more accurately be ascertained. Accordingly, the accuracy of determination (detection) of the state of thermal degradation of exhaust purifying catalyst, which is made using the degree of thermal degradation, also improves.

Preferably, the degree of thermal degradation calculating unit calculates a larger value as the rate of progress of thermal degradation in the predetermined time period, when the temperature of the exhaust purifying catalyst becomes higher.

Here, the rate of progress of thermal degradation generally has a tendency that it is small when the temperature of exhaust purifying catalyst is low and it becomes higher as the temperature increases. In this regard, according to the present invention, as the temperature of exhaust purifying catalyst increases, a larger value is calculated as the rate of progress of thermal degradation. By this calculation, the rate of progress of thermal degradation corresponding to the amount of thermal degradation that actually developed in the predetermined time period from the last to the present time can be obtained. Therefore, by adding the value to the integrated value of rate of progress of thermal degradation up to the last time, the degree of thermal degradation from the start of use of the exhaust purifying catalyst to the present can accurately be calculated.

More preferably, the degree of thermal degradation calculating unit calculates a smaller value as the rate of progress of thermal degradation in the predetermined time period, when the integrated value up to the last time becomes larger.

Here, the rate of progress of thermal degradation generally has a tendency that it is large when thermal degradation is not much developed (degree of thermal degradation is small) and it becomes smaller as thermal degradation proceeds (degree of thermal degradation increases). In this regard, according to the present invention, as the integrated value of the rate of progress of thermal degradation up to the last time (degree of thermal degradation) increases, a smaller value is calculated as the rate of progress of thermal degradation. By this calculation, the rate of progress of thermal degradation corresponding to the amount of thermal degradation that actually developed in the predetermined time period from the last to the present time can be obtained. Therefore, by adding the value to the integrated value up to the last time, the degree of thermal degradation from the start of use of the exhaust purifying catalyst to the present can accurately be calculated.

More preferably, the device for detecting a state of thermal degradation further includes a storage unit storing in advance the rate of progress of thermal degradation corresponding to the degree of thermal degradation and the temperature of exhaust purifying catalyst; wherein the degree of thermal degradation calculating unit reads the rate of progress of thermal degradation corresponding to the integrated value of rate of progress of thermal degradation up to the last time and the temperature of exhaust purifying catalyst at that time from the storage unit, and adds the read value as the rate of progress of thermal degradation in the predetermined time period to the integrated value up to the last time.

According to this arrangement, when the degree of thermal degradation is calculated by the degree of thermal degradation calculation unit, the rate of progress of thermal degradation corresponding to the integrated value of the rate of progress of thermal degradation up to the last time, that is, the degree of thermal degradation up to the last time and the temperature of exhaust purifying catalyst at that time, is read from the storage unit, and this is added as the rate of progress of thermal degradation for the predetermined time period, to the integrated value up to the last time. In this manner, the relation among the rate of progress of thermal degradation and the degree of thermal degradation and the temperature of exhaust purifying catalyst is stored in advance in the storage unit, and the rate of progress of thermal degradation is read at every predetermined time period. Therefore, burden on the operating device can be alleviated as compared with the example in which the rate of progress of thermal degradation corresponding to the temperature of exhaust purifying catalyst and the degree of degradation is calculated by operation at every predetermined time period.

More preferably, the determining unit determines that the exhaust purifying catalyst is thermally degraded and defective, when the degree of thermal degradation calculated by the degree of thermal degradation calculating unit is larger than a predetermined value.

According to this arrangement, when the state of thermal degradation of exhaust purifying catalyst is detected, the determining unit compares the degree of thermal degradation calculated by the degree of thermal degradation calculating unit with a predetermined value. If the comparison result indicates that the degree of thermal degradation is larger than the predetermined value, it is determined that the exhaust purifying catalyst is defective because of thermal degradation. Therefore, by setting an upper limit value or a value close to the upper limit value of tolerable range of thermal degradation of exhaust purifying catalyst as the predetermined value, it becomes possible to ascertain whether the state of thermal degradation of the exhaust purifying catalyst is defective or not.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
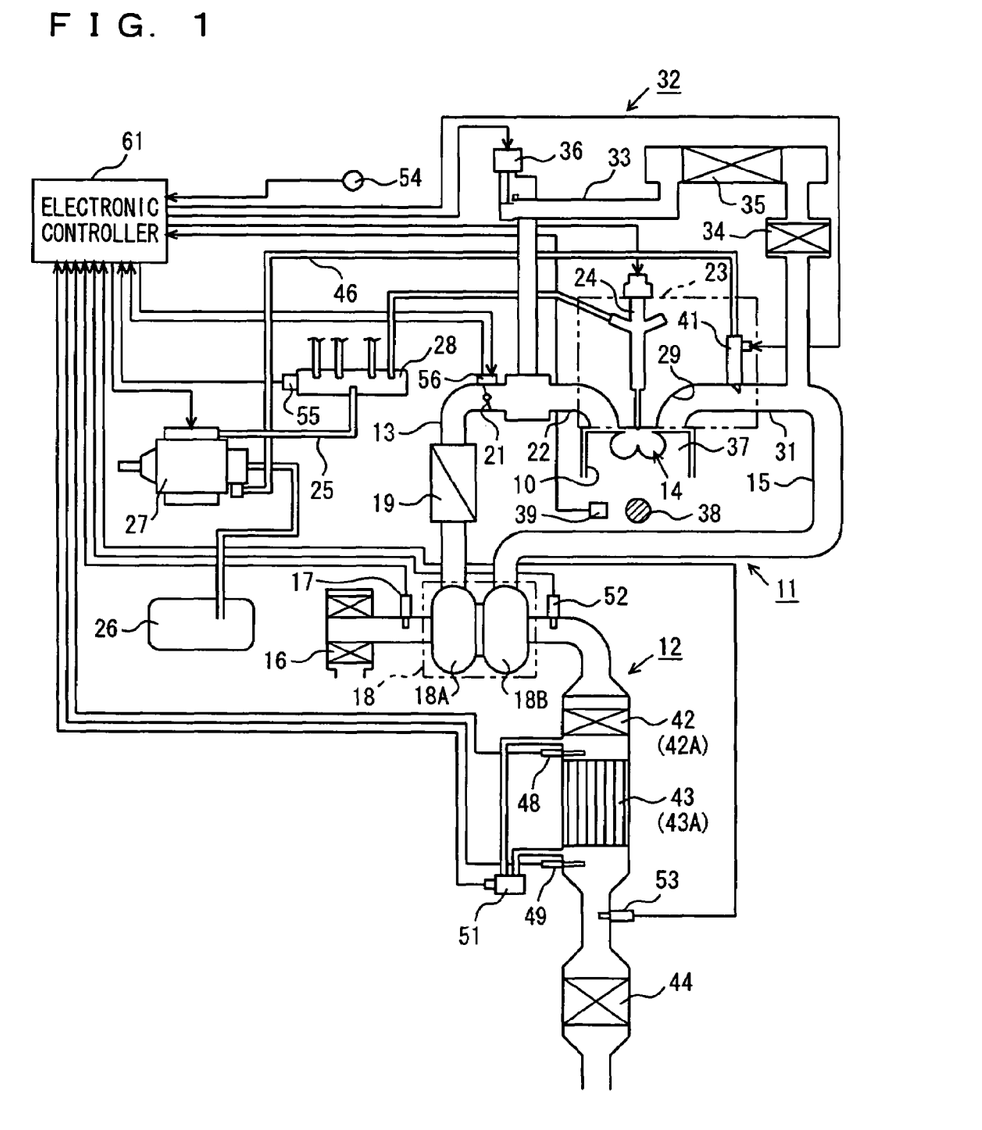
FIG. 1 is a schematic diagram showing a configuration of an engine and an exhaust purifier in accordance with an embodiment implementing the present invention.

In the following, an embodiment of the present invention will be described with reference to the figures. FIG. 1 shows configurations of a multi-cylinder diesel engine (hereinafter simply referred to as the engine) as an internal combustion engine and its exhaust purifier 12, to which the present embodiment is applied.

Engine 11 mainly includes an intake passage 13, a combustion chamber 14 provided in each cylinder 10, and an exhaust passage 15. At the uppermost stream of intake passage 13, an air cleaner 16 for purifying air introduced to intake passage 13 is provided. In engine 11, an air flow meter 17 for detecting air flow rate in intake passage 13, a compressor 18A of a turbo charger 18, an inter cooler 19, and an intake throttle valve 21 are arranged in this order to the downstream side of intake air flow, from air cleaner 16. Intake passage 13 is branched at an intake manifold 22 provided downstream of intake throttle valve 21 along the intake air flow, and connected through this branch to combustion chamber 14 of each cylinder 10.

At a cylinder head 23 of engine 11, a fuel injection valve 24 for injecting fuel for combustion in combustion chamber 14 is provided, for each cylinder 10. To each fuel injection valve 24, fuel is supplied from a fuel tank 26 through a fuel supply path 25. In fuel supply path 25, a fuel pump 27 that sucks in the fuel from fuel tank 26 and pressurizes and discharges the fuel, and a common rail 28 that is a high-pressure fuel pipe for storing and pressurizing the discharged high-pressure fuel are provided. Fuel injection valve 24 of each cylinder 10 is connected to common rail 28.

A connection portion between exhaust passage 15 and each combustion chamber 14 provides an exhaust port 29. Along exhaust passage 15, an exhaust manifold 31 for collecting exhaust gas discharged though exhaust port 29 from each combustion chamber 14, and a turbine 18B of turbo charger 18 are provided.

Further, engine 11 is provided with an exhaust gas recirculation (hereinafter denoted by EGR) device 32. EGR device 32 is formed to include an EGR passage 33 that communicates with intake passage 13 and exhaust passage 15. The upstream side of EGR passage 33 is connected between exhaust manifold 31 and turbine 18B of exhaust passage 15. Along EGR passage 33, an EGR cooler catalyst 34 purifying re-circulated exhaust gas, an EGR cooler 35 cooling re-circulated exhaust gas, and an EGR valve 36 adjusting the flow rate of re-circulated exhaust gas, are provided in this order from the upstream side. The downstream side of EGR passage 33 is connected between intake throttle valve 21 and intake manifold 22 of intake passage 13.

In engine 11 as described above, the air taken in to intake passage 13 is cleaned by air cleaner 16, and introduced to compressor 18A of turbo charger 18. In compressor 18A, the introduced air is compressed, and discharged to inter cooler 19. The air that becomes hot by compression is cooled by inter cooler 19, and then distributed and supplied to combustion chambers 14 of respective cylinders 10, through intake throttle valve 21 and intake manifold 22. The flow rate of air in intake passage 13 is adjusted by open position control of intake throttle valve 21. Further, the flow rate of air (amount of intake air) is detected by air flow meter 17.

To combustion chamber 14 to which the air is introduced, fuel is injected from fuel injection valve 24 in a compression stroke of each cylinder 10. A mixture of air introduced through intake passage 13 and fuel injected from fuel injection valve 24 is burned in the combustion chamber 14. The high-temperature, high-pressure combustion gas generated at this time reciprocates a piston 37, so that a crank shaft 38 as an output shaft is rotated, providing driving force (output torque) of engine 11. A rotation speed sensor 39 for detecting the number of rotation of crank shaft 38 (engine speed) is mounted on engine 11.

An exhaust gas generated by combustion in combustion chamber 14 of each cylinder 10 is introduced through exhaust manifold 31 to turbine 18B of turbo charger 18. When turbine 18B is driven by the flowing force of the introduced exhaust gas, compressor 18A provided in intake passage 13 is driven in a linked manner, and the air is compressed in the manner as described above.

A part of the exhaust gas generated by combustion is introduced to EGR passage 33. The exhaust gas introduced to EGR passage 33 is purified by EGR cooler catalyst 34 and cooled by EGR cooler 35, and then re-circulated to the air downstream of intake throttle valve 21 of intake passage 13, along the intake air flow. The flow rate of exhaust gas re-circulated in this manner is adjusted by open position control of EGR valve 36.

Engine 11 is structured as described above. Next, exhaust gas purifier 12 for purifying the exhaust gas discharged from engine 11 will be described. Exhaust gas purifier 12 includes an addition valve 41 and, in addition, a plurality of catalytic converters (first, second and third catalytic converters 42, 43 and 44).

The first catalytic converter 42 of the uppermost stream is arranged on the downstream side of turbine 18B along the exhaust gas flow. In the first catalytic converter 42, an NOx storage reduction catalyst 42A is contained as an exhaust purifying catalyst. NOx catalyst 42A is formed, for example, by a honeycomb-shaped structured body as a carrier, carrying an NOx absorber and catalyst grains of noble metal on its surface. The NOx absorber has such a characteristic that it absorbs nitrogen oxide where oxygen concentration in the exhaust gas is high and emits nitrogen oxide where the oxygen concentration is low. When nitrogen oxide is emitted to the exhaust gas and the exhaust gas contains carbon hydride HC, carbon mono oxide CO or the like, the noble metal catalyst promotes oxidation of carbon hydride HC and carbon mono oxide CO, so that oxidation-reduction takes place between these, with nitrogen oxide NOx being the oxidizing component and carbon hydride HC and carbon mono oxide CO being the reducing component. Specifically, carbon hydride HC and carbon mono oxide CO are oxidized to carbon dioxide $CO_2$ or water $H_2O$, and nitrogen oxide NO is reduced to nitrogen $N_2$.

The second catalytic converter 43 is arranged downstream of the first catalytic converter 42 along the exhaust gas flow. In the second catalytic converter 43, a storage reduction NOx catalyst 43A as an exhaust purifying catalyst 43A is contained as the exhaust purifying catalyst. The NOx catalyst 43A includes a porous material that allows passage of gas component in the exhaust gas and prevents passage of particulate matter PM in the exhaust gas. In NOx catalyst 43A, the porous material serves as a carrier that carries the NOx absorber and noble metal catalyst, similar to NOx catalyst 42A described above.

The third catalytic converter 44 is arranged downstream of the second catalytic converter 43 along the exhaust gas flow. The third catalytic converter 44 contains an oxidation catalyst that purifies the exhaust gas through oxidation of carbon hydride HC and carbon mono oxide CO in the exhaust gas.

After absorbing a prescribed limit amount of nitrogen oxide NOx, NOx catalysts 42A and 43A no longer absorb any nitrogen oxide NOx, even when the exhaust gas has high oxygen concentration. Therefore, separate from fuel injection valve 24 injecting fuel to be burned in combustion chamber 14, an addition valve 41 is provided upstream of the first catalytic converter 42 in the exhaust passage 15. Addition valve 41 is connected to the fuel pump 27 through fuel passage 46, and injects and adds the fuel supplied from fuel pump 27 as a reducing agent to the exhaust gas. By the addition of reducing agent, nitrogen oxide NOx absorbed by each of the NOx catalysts 42A and 43A is again discharged, reduced and purified, so that the NOx absorbing ability of NOx catalysts 42A and 43A is recovered. Thus, the amount of NOx absorption is prevented from reaching the limit. Further, in the second catalytic converter 43, purification of particulate matter PM is executed simultaneously.

In a space of exhaust passage 15 between the first and second catalytic converters 42 and 43, an exhaust temperature sensor 48 is arranged for detecting the temperature of exhaust gas passing through the space, that is, the temperature of exhaust gas before entering the second catalytic converter 43. Further, in a space of exhaust passage 15 downstream of the second catalytic converter 43, an exhaust temperature sensor 49 is arranged for detecting the temperature of exhaust gas passing through the space, that is, the temperature of exhaust gas immediately after passing the second catalytic converter 43. Further, in exhaust passage 15, a differential pressure sensor 51 is provided, for detecting differential pressure between the pressure of exhaust gas on the upstream side and downstream side of second catalytic converter 43. In exhaust passage 15, upstream of the first catalytic converter 42 along the exhaust flow and between the second and third catalytic converters 43 and 44, oxygen sensors 52 and 53 are arranged, respectively, for detecting oxygen concentration in the exhaust gas.

Engine 11 and exhaust purifier 12 described above are controlled by an electronic controller 61. Electronic controller 61 includes a CPU executing various processes related to control of engine 11, an ROM storing a program and data necessary for the control, an RAM storing result of processing by the CPU and the like, and input/output port for communication of information with the outside.

To an input port of electronic controller 61, in addition to the sensors described above, an accelerator sensor 54 detecting accelerator position (amount of pressing accelerator pedal by the driver), a common rail sensor 55 detecting internal pressure (rail pressure) of common rail 28, a throttle valve sensor 56 detecting open position of intake throttle valve 21 and the like are connected.

Further, to the output port of electronic controller 61, intake throttle valve 21, fuel injection valve 24, fuel pump 27, addition valve 41, EGR valve 36 and the like are connected. Based on the results of detection by these sensors, electronic controller 61 controls these components connected to the output port, and realizes control of various operations of engine 11. Control of various operations includes control of fuel injection by fuel injection valve 24, control related to combustion and control related to exhaust purification.

By way of example, in fuel injection control, electronic controller 61 calculates a base injection amount optimal for the state of operation of engine 11, based on the accelerator position detected by accelerator sensor 54 and engine speed detected by rotation speed sensor 39. Further, by correcting a base maximum injection amount (theoretically possible maximum injection amount) determined by the engine speed in accordance with the signals from various sensors, the maximum injection amount is determined. By comparing the base injection amount and maximum injection amount, the smaller of these two is set as a target injection amount. Further, the controller calculates a base injection timing based on the accelerator position and the engine speed, corrects the same in accordance with the signals from various sensors, and calculates a target injection timing optimal for the state of operation of engine 11 at that time. Based on the target injection amount and target injection timing, the controller controls power supply to fuel injection valve 24, to open/close the fuel injection valve 24.

In combustion control, electronic controller 61 selects, among a preset plurality of combustion modes, one combustion mode that matches the state of operation of engine 11. The plurality of combustion modes include a normal combustion mode and a low-temperature combustion mode. Here, in engine 11 of the present embodiment to which EGR device 32 is applied, when the amount of inert gas in combustion chamber 14, that is, the amount of re-circulated exhaust gas increases while the timing of fuel injection from fuel injection valve 24 to combustion chamber 14 is constant, the amount of soot generated in combustion chamber 14 increases gradually. When the amount of re-circulated exhaust gas reaches a prescribed value, the amount of generated soot peaks. When the amount of re-circulated exhaust gas exceeds the prescribed value, temperature of fuel in combustion chamber 14 and temperature therearound decrease, and the amount of soot generation in combustion chamber 14 decreases. In the low-temperature combustion mode, the exhaust gas larger in amount than the prescribed value is re-circulated while the fuel is burned in combustion chamber 14. In contrast, in the normal combustion mode, the exhaust gas smaller in amount than the prescribed value is re-circulated while the fuel is burned in combustion chamber 14.

Further, electronic controller 61 executes as one control related to exhaust purification, control on exhaust purifying catalyst. For this control, four catalyst control modes, that is, catalyst regeneration control mode, sulfur poisoning recovery control mode, NOx reduction control mode and normal control mode are set, and electronic controller 61 selects and executes the catalyst control mode in accordance with the state of catalytic converters 42 to 44.

In the catalyst regeneration control mode, particulate matter PM deposited particularly on the second catalytic converter 43 is burned and discharged in the form of carbon dioxide $CO_2$ and water $H_2O$, in which the temperature of the carrier (catalyst temperature) is set to a high temperature (600° C.~700° C.) by continuously repeating addition of reducing agent (fuel) from addition valve 41.

In the sulfur poisoning recovery control mode, when NOx catalysts 42A and 43A are poisoned by sulfur oxide and the ability of absorbing nitrogen oxide NOx decreases, operation is controlled to discharge sulfur oxide SOx.

In the NOx reduction control mode, nitrogen oxide NOx stored in NOx catalysts 42A and 43A is reduced to nitrogen $N_2$, carbon dioxide $CO_2$ and water $H_2O$ and discharged. In this mode, by intermittent addition of reducing agent (fuel) at a relatively long interval from addition valve 41, the catalyst temperature is set to a relatively low temperature (for example, 250° C. to 500° C.). A state other than these corresponds to the normal control mode, in which the reducing agent (fuel) is not added from addition valve 41.

Further, electronic controller 61 performs control for detecting a state of thermal degradation of NOx catalysts 42A and 43A, as an operation related to exhaust purifying control. The control is performed as NOx catalysts 42A and 43A degrade as they are exposed to exhaust heat, and their exhaust purifying performance, here the exhaust purifying performance on carbon hydride HC in particular, decreases. More specifically, thermal degradation proceeds dependent on the temperature and exposed time of NOx catalysts 42A and 43A that are exposed to heat to a high temperature, and eventually the catalysts fail to exhibit the desired exhaust purifying performance. In order to address such situation, it becomes necessary to ascertain the state of thermal degradation as a premise, and therefore, detection control is performed.

Figure 2:
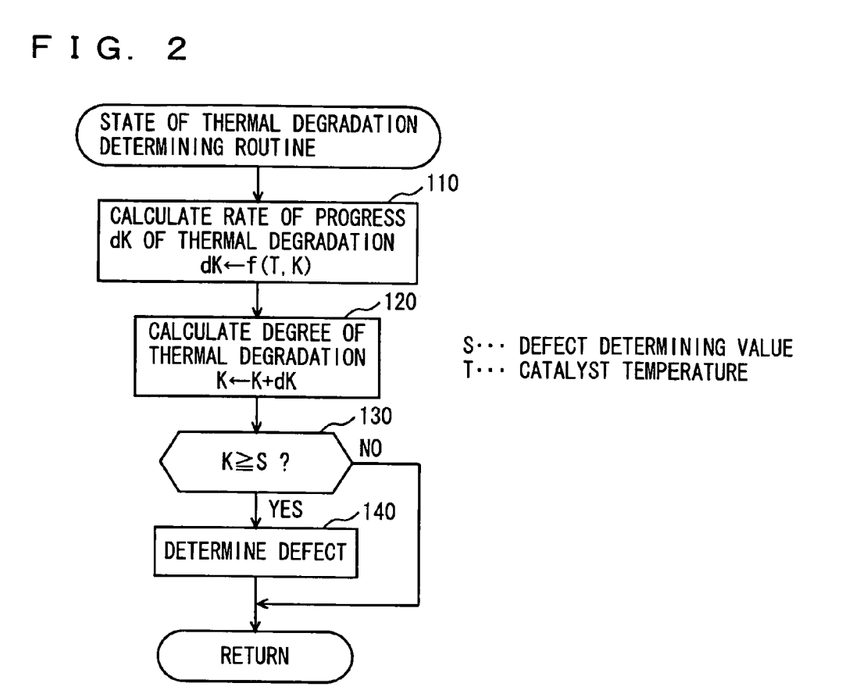
FIG. 2 is a flowchart representing a state of thermal degradation determining routine.

FIG. 2 is a flowchart representing a "thermal degradation state determining routine" for determining the state of thermal degradation of NOx catalysts 42A and 43A. The series of processes shown in this routine is executed repeatedly at every predetermined time period, from the start to the end of engine 11, that is, from when the ignition switch is turned on until the switch is turned off.

In thermal degradation state determining routine, first, in step 110, electronic controller 61 reads degree of thermal degradation K calculated in the last control period. The degree of thermal degradation K is stored in a non-volatile memory such as a back-up RAM or a flash memory of electronic controller 61, which is held even when the power of electronic controller 61 is turned off. Therefore, after power-on, calculation of the degree of thermal degradation K starts from the value stored in electronic controller 61.

Further, in step 110, the temperature of NOx catalysts 42A and 43A (catalyst temperature T) at that time is read. Here, as catalyst temperature T, a value estimated from the exhaust temperature and state of operation of engine 11 may be used.

Based on the degree of thermal degradation K and catalyst temperature T, rate of progress dK of thermal degradation is calculated. For the calculation, reference is made to a map of FIG. 3, which is stored in advance in, for example, a memory (ROM). The map indicates the rate of progress of thermal degradation of NOx catalysts 42A and 43A in a predetermined time period (control period of thermal degradation state determining routine), and defines relation between the rate of progress dK of thermal degradation and each of the catalyst temperature T and degree of thermal degradation K.

Figure 3:
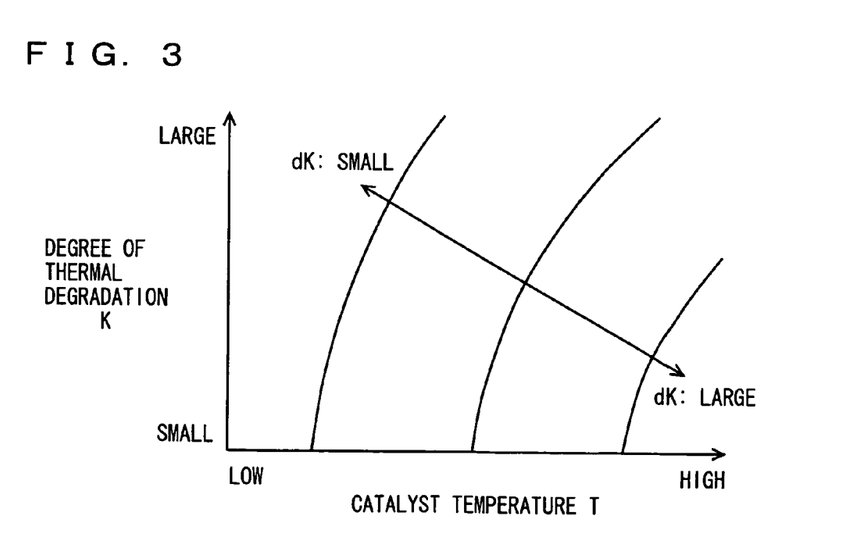
FIG. 3 is a schematic illustration showing a map structure of the map used for calculating rate of progress dK of thermal degradation.
Figure 4:
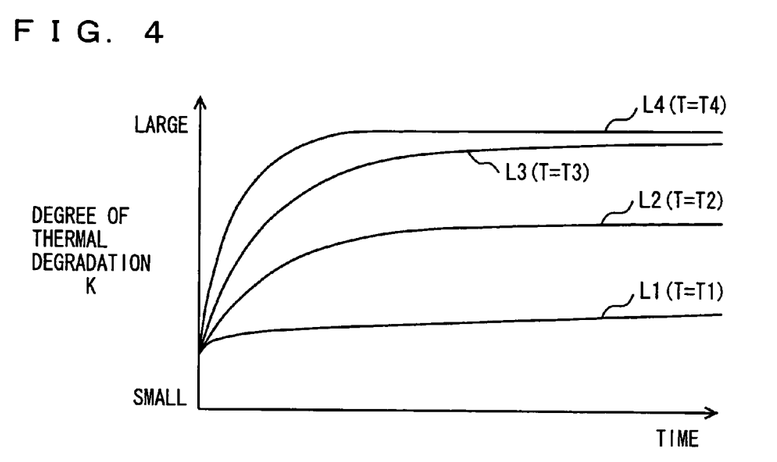
FIG. 4 is a graph representing change in degree of thermal degradation with time, at various catalyst temperatures.

The map is formed in consideration of the tendency shown in FIG. 4, which shows the relation between each of catalyst temperature T, time, and the degree of degradation K. In FIG. 4, line L1 shows variation with time in degree of degradation when catalyst temperature T is set to a value T1, and line L2 shows variation with time in degree of degradation when catalyst temperature T is set to a value T2 (>T1). Similarly, line L3 shows variation with time in degree of degradation when catalyst temperature T is set to a value T3 (>T2), and line L4 shows variation with time in degree of degradation when catalyst temperature T is set to a value T4 (>T3).

Here, the degree of thermal degradation K is a parameter representing how NOx catalysts 42A and 43A have been degraded from the start of use. In FIG. 4, purification ratio of carbon hydride HC by NOx catalysts 42A and 43A is represented by X, and twice the natural logarithm of the reciprocal of X, that is, $LN(LN(1/X))$ is used as the degree of thermal degradation K. The purification ratio X refers to the ratio between "the amount of carbon hydride HC flowing to NOx catalysts 42A and 43A" and "amount of carbon hydride purified by NOx catalysts 42A and 43A." Further, the "amount of carbon hydride purified by NOx catalysts 42A and 43A" is the difference between the amount of carbon hydride HC flowing to NOx catalyst 42A and the amount of carbon hydride HC flowing out from NOx catalyst 43A.

Here, the degree of degradation K may be regarded as integration of the amount of thermal degradation per predetermined time period (variation gradient of thermal degradation, hereinafter referred to as "rate of progress dK of thermal degradation") of NOx catalysts 42A and 43A. Assuming that the catalyst temperature T is constant, the rate of progress dK of thermal degradation is not constant, but vary in accordance with the degree K of thermal degradation, as can be seen from FIG. 4. Regardless of the catalyst temperature (T1 to T4), the rate of progress dK of thermal degradation is large when the degree of thermal degradation K is small, and it becomes smaller as the degree of thermal degradation K becomes larger. In other words, thermal degradation proceeds rapidly when NOx catalysts 42A and 43A are first exposed to heat or immediately thereafter. The progress of thermal degradation, however, slows down after NOx catalysts 42A and 43A are kept exposed to heat over a long time. The reason for this is that, as described with reference to the prior art, surface area of noble metal catalyst related to the exhaust purifying performance of NOx catalysts 42A and 43A decreases as the time of exposure to heat becomes longer, and that the degree of decrease is large when the time of exposure to heat is short, while it becomes smaller as the exposure time becomes longer. Eventually, the surface area converges to a certain value. When the catalyst temperature is T3 or T4, the degree of thermal degradation K converges to the certain value in a relatively short time period as represented by lines L3 and L4. When the catalyst temperature is T1 or T2, the degree of thermal degradation K also converges to the certain value, though it takes time.

Further, it can be seen from FIG. 4 that the rate of progress dK of thermal degradation differs dependent on the catalyst temperature T, if the degree of thermal degradation K is constant. Specifically, the rate of progress dK of thermal degradation is small when the catalyst temperature T is low, and it becomes larger as the catalyst temperature T increases.

Considering the tendency described above, the map shown in FIG. 3 is set as follows. Assuming that the catalyst temperature T is constant, the rate of progress dK of thermal degradation is large when the degree of thermal degradation K is small, and the rate of progress dK of thermal degradation becomes smaller as the degree of thermal degradation becomes higher. Assuming that the degree of thermal degradation K is constant, the rate of progress dK of thermal degradation is small when the catalyst temperature T is low, and the rate of progress dK of thermal degradation becomes larger as the catalyst temperature T increases.

In step 110, the rate of progress dK of thermal degradation corresponding to the catalyst temperature T and degree of degradation K at that time is found from the map of FIG. 3. The rate of progress dK of thermal degradation thus found corresponds to the amount of thermal degradation (amount of thermal degradation per unit time) in the period from the calculation of the degree of thermal degradation K in the last control period until the present control period.

Then the flow proceeds to step 120, in which the rate of progress dK of thermal degradation found in step 10 is added to the degree of thermal degradation K up to the last time, and the result is set as a new degree of thermal degradation K (of the present control period). Therefore, by repeating the processes of steps 110 and 120, the rate of progress dK of thermal degradation is integrated and the degree of thermal degradation K is updated.

Thereafter, the flow proceeds to 130, in which whether the degree of thermal degradation K of step 120 is equal to or larger than a defect determining value S, that is, the predetermined value or not is determined. As the defect determining value S, an upper limit tolerable to ensure the exhaust purifying performance on carbon hydride HC of NOx catalysts 42A and 43A or a value close to that is set.

When the conditions of determination in step 130 are not satisfied, it is considered that the thermal degradation of NOx catalysts 42A and 43A is not yet so severe as to cause much damage on the exhaust purifying performance. Therefore, the thermal degradation state determining routine is terminated. On the contrary, if the conditions of determination in step 130 are satisfied, it means that the thermal degradation of NOx catalysts 42A and 43A is severe enough to cause damage to the exhaust purifying performance, and therefore, in step 140, a defect determination (determination that there is a defect) is made. After the determination, the thermal degradation state determining routine is terminated.

The processes of steps 110 and 120 by electronic controller 61 in the thermal degradation state determining routine described above correspond to the degree of thermal degradation calculating unit, and the processes of steps 130 and 140 correspond to the determining unit.

Figure 5:
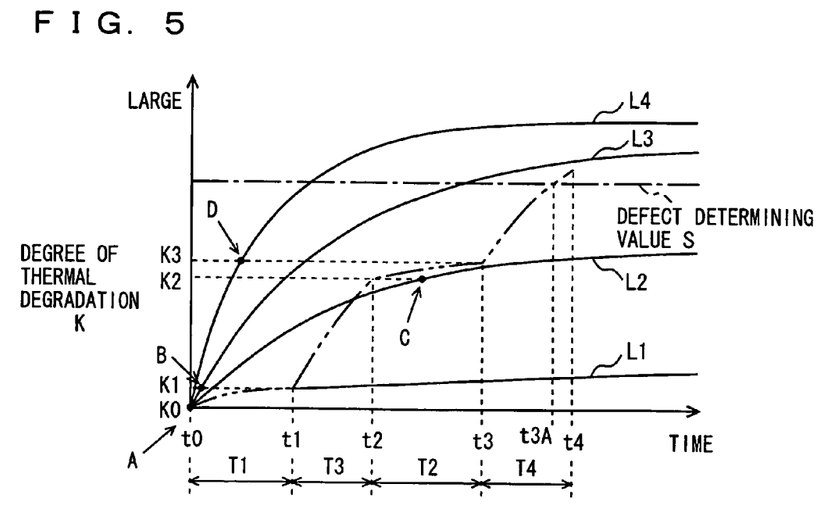
FIG. 5 is a timing chart representing an example of the manner of change of degree of thermal degradation K.

When the process is repeated in accordance with the thermal degradation state determining routine described above, the degree of thermal degradation K changes as represented, for example, by a two-dotted line in FIG. 5, as the amount of heat (represented by catalyst temperature T) received by NOx catalysts 42A and 43A changes with time. Further, based on the degree of thermal degradation K, the state of thermal degradation is determined. In this example, for convenience of description, it is assumed that NOx catalysts 42A and 43A were not at all degraded thermally (with the degree of thermal degradation at that time being K0) at the start of exposure to heat at time point t0. Further, in this example, the catalyst temperature T attains to T1 in the time period from t0 to t1, the catalyst temperature T attains to T3 in the time period to t2, the catalyst temperature T attains to T2 in the time period to t3, and then the catalyst temperature T attains to T4 in the time period to t4.

At time point t0, the degree of thermal degradation K is K=K0 as described above. Further, on the line L1 representing the characteristic of degree of thermal degradation K at the catalyst temperature T 1, the point A that corresponds to K0 is determined as the rate of progress dK of thermal degradation.

In the period of t0 to t1, the rate of progress dK of thermal degradation is calculated based on the catalyst temperature T and the degree of thermal degradation K up to the last time, at every predetermined time interval. The rate of progress dK of thermal degradation thus calculated changes along the line L1, and therefore, it generally tends to be small in the period as a whole and within the period, it becomes gradually smaller with time. The rate of progress dK of thermal degradation is added to the degree of thermal degradation K up to the last time, and the degree of thermal degradation K of the present time is calculated. Therefore, the degree of thermal degradation K increases slowly in the period as a whole, and the rate of increase becomes gradually smaller with time. At time point t1, the degree of thermal degradation K attains to K1 (where K0<K1<S). Therefore, at this point, conditions of determination of step 130 are not satisfied, and therefore, defect determination (step 140) is not made.

In the period immediately after time point t1 to time point t2, the rate of progress dK of thermal degradation is calculated based on the catalyst temperature T (=T3) and the degree of thermal degradation K up to the last time, at every predetermined time interval. The rate of progress dK of thermal degradation thus calculated changes in accordance with the line L3 representing characteristics of the degree of thermal degradation at catalyst temperature T (=T3). Therefore, on line L3, the point B that corresponds to the value K1 is regarded as the initial value of rate of progress dK of thermal degradation in this period. Further, the rate of progress dK of thermal degradation generally tends to be large in the period as a whole, and it gradually becomes smaller with time within the time period. The rate of progress dK of thermal degradation is added to the degree of thermal degradation K up to the last time, and the degree of thermal degradation K of the present time is calculated. Therefore, the degree of thermal degradation K increases rather quickly in the period as a whole, with the rate of increase becoming gradually smaller with time. At time point t2, the degree of thermal degradation K attains to K2 (where K1<K2<S). Therefore, at this point, conditions of determination of step 130 are not satisfied either, and therefore, defect determination (step 140) is not made.

In the period immediately after time point t2 to time point t3, the rate of progress dK of thermal degradation is calculated based on the catalyst temperature T (=T2) and the degree of thermal degradation K up to the last time, at every predetermined time interval. The rate of progress dK of thermal degradation thus calculated changes in accordance with the line L2 representing characteristics of the degree of thermal degradation at catalyst temperature T (=T2). Therefore, on line L2, the point C that corresponds to the value K2 is regarded as the initial value of rate of progress dK of thermal degradation in this period. The rate of progress dK of thermal degradation generally tends to be small in the period as a whole, and it gradually becomes smaller with time within the time period. The rate of progress dK of thermal degradation is added to the degree of thermal degradation K up to the last time, and the degree of thermal degradation K of the present time is calculated. Therefore, the degree of thermal degradation. K increases rather slowly in the period as a whole, with the rate of increase becoming gradually smaller with time. At time point t3, the degree of thermal degradation K attains to K3 (where K2<K3<S). Therefore, at this point, conditions of determination of step 130 are not satisfied either, and therefore, defect determination (step 140) is not made.

In the period immediately after time point t3 to time point t4, the rate of progress dK of thermal degradation is calculated based on the catalyst temperature T (=T4) and the degree of thermal degradation K up to the last time, at every predetermined time interval. The rate of progress dK of thermal degradation thus calculated changes in accordance with the line L4 representing characteristics of the degree of thermal degradation at catalyst temperature T (=T4). Therefore, on line L4, the point D that corresponds to the value K3 is regarded as the initial value of rate of progress dK of thermal degradation in this period. Further, the rate of progress dK of thermal degradation generally tends to be large in the period as a whole, and it gradually becomes smaller with time within the time period. The rate of progress dK of thermal degradation is added to the degree of thermal degradation K up to the last time, and the degree of thermal degradation K of the present time is calculated. Therefore, the degree of thermal degradation K increases rather quickly in the period as a whole, with the rate of increase becoming gradually smaller with time. At time point t3A in this period, the degree of thermal degradation K attains to the defect determining value S. After time point t3A, the degree of thermal degradation K becomes larger than the defect determining value S. Therefore, though the conditions for determination of step 130 are not satisfied and defect determination is not done before time point t3A of this period, the conditions for determination of step 130 are satisfied after t3A, and hence, defect determination (step 140) is made.

The embodiment described in detail above attains the following effects.

(1) The rate of progress dK of thermal degradation differs dependent on catalyst temperature T as well as the degree of thermal degradation K. In connection with this point, in the present embodiment, when the rate of progress dK of thermal degradation is integrated, the rate of progress dK of thermal degradation within the predetermined time period mentioned above is calculated based on the integrated value of the rate of progress dK of thermal degradation up to the last time, that is, the degree of thermal degradation K calculated last time and the catalyst temperature T at that time. The rate of progress dK of thermal degradation is added to the integrated value up to the last time (degree of thermal degradation K calculated last time), so that the degree of thermal degradation K up to the present time of NOx catalysts 42A and 43A is calculated. Therefore, as compared with the prior art in which the rate of progress dK of thermal degradation calculated based on the catalyst temperature T only is integrated, the value of rate of progress dK of thermal degradation more closely reflecting the actual variation is integrated, and therefore, the degree of thermal degradation K of NOx catalysts 42A and 43A can more accurately be ascertained, and the accuracy of detecting any defect caused by thermal degradation can be improved.

(2) Generally, the rate of progress dK of thermal degradation is small when the catalyst temperature T is low, and becomes larger as the catalyst temperature T increases. In this regard, in the present embodiment, such tendency is taken into consideration and as the catalyst temperature T increases, a larger value is calculated as the rate of progress dK of thermal degradation. By this calculation, it becomes possible to obtain the rate of progress dK of thermal degradation that corresponds to the amount of thermal degradation actually developed in the predetermined time period from the last time to the present time at the catalyst temperature at that time. Therefore, by adding this value to the integrated value of rate of progress dK of thermal degradation up to the last time, the degree of thermal degradation K from the start of use of exhaust purifying catalyst to the present time point can more accurately be calculated, and the effect (1) above can more reliably be attained.

(3) Generally, the rate of progress dK of thermal degradation is large when thermal degradation of NOx catalysts 42A and 43A is not much developed (when the degree of thermal degradation K is small), and it becomes smaller as thermal degradation proceeds (when the degree of thermal degradation K becomes larger). In this regard, in the present embodiment, such tendency is taken into consideration and as the integrated value of the rate of progress dK of thermal degradation up to the last time (degree of thermal degradation K) increases, a smaller value is calculated as the rate of progress dK of thermal degradation. By this calculation, it becomes possible to obtain the rate of progress dK of thermal degradation that corresponds to the amount of thermal degradation actually developed in the predetermined time period from the last time to the present time. Therefore, by adding this value to the integrated value up to the last time, the degree of thermal degradation K from the start of use of exhaust purifying catalyst to the present time point can more accurately be calculated, and the effect (1) above can more reliably be attained.

(4) The relation among the degree of thermal degradation K, catalyst temperature T and the rate of progress dK of thermal degradation is stored in the form of a map in the ROM and the rate of progress dK of thermal degradation is read from the map at every predetermined time period. Therefore, as compared with calculation of the rate of progress dK of thermal degradation corresponding to the degree of thermal degradation K and the catalyst temperature T at every predetermined time period, the burden on electronic controller 61 can be alleviated.

(5) For detecting any defect caused by thermal degradation, the degree of thermal degradation K is compared with a defect determining value S. If the degree of thermal degradation K is found to be larger than the defect determining value S as a result of comparison, NOx catalysts 42A and 43A are determined to be thermally degraded and defective. Therefore, it is possible, from the result of determination, to know whether NOx catalysts 42A and 43A are defective because of thermal degradation or not. If they are determined to be thermally degraded and defective, necessary measure such as a change in the state of combustion or alarm to the operation may be taken.

The present invention may be implemented in different embodiments such as described below.

In the embodiment above, whether the state of thermal degradation is normal or not may be determined by comparing the degree of thermal degradation K with a predetermined value. By way of example, when the degree of thermal degradation K is smaller than the defect determining value S, a determination of "normal" may be made, or a normal determining value smaller than the defect determining value S may be set and a determination of "normal" may be made when the degree of thermal degradation K is smaller than the normal determining value.

In the embodiment above, the rate of progress dK of thermal degradation is calculated using a map. Alternatively, the rate of progress dK of thermal degradation may be calculated in accordance with a predetermined equation using the catalyst temperature T and the degree of thermal degradation K as parameters.

The present invention is applicable not only to a diesel engine but also to any engine such as a lean combustion type engine having catalyst arrangement similar to the embodiment above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device that detects a state of thermal degradation of an exhaust purifying catalyst, comprompising:

a degree of thermal degradation calculating unit that is programmed to calculate a degree of thermal degradation of the exhaust purifying catalyst by integrating a rate of progress of thermal degradation of the exhaust purifying catalyst at every predetermined time period; and a determining unit that is programmed to determine a state of thermal degradation of the exhaust purifying catalyst based on the degree of thermal degradation calculated by the thermal degradation calculating unit; wherein the calculating unit is programmed to calculate the rate of progress of thermal degradation of the exhaust purifying catalyst at a present time period based on an integrated value of the rate of progress of thermal degradation at an immediately preceding time period and temperature of the exhaust purifying catalyst at the present time period, and programmed to calculate an accumulated value for the degree of thermal degradation of the exhaust purifying catalyst by cumulatively adding said degree of thermal degradation calculated up to the immediately preceding time period.

2. The device that detects a state of thermal degradation of an exhaust purifying catalyst according to claim 1, wherein the calculating unit is programmed to calculate a larger value for the rate of progress of thermal degradation during a time period when the temperature of the exhaust purifying catalyst increases.

3. The device that detects a state of thermal degradation of an exhaust purifying catalyst according to claim 2, wherein the determining unit is programmed to determine that the exhaust purifying catalyst is thermally degraded and defective, when the degree of thermal degradation calculated by the calculating unit is larger than a defect determining value.

4. The device that detects a state of thermal degradation of an exhaust purifying catalyst according to claim 1, wherein the calculating unit is programmed to calculate a smaller value for the rate of progress of thermal degradation during a time period when the accumulated value for the degree of thermal degradation of the exhaust purifying catalyst increases.

5. The device that detects a state of thermal degradation of an exhaust purifying catalyst according to claim 4, wherein the determining unit is programmed to determine that the exhaust purifying catalyst is thermally degraded and defective, when the degree of thermal degradation calculated by the calculating unit is larger than a defect determining value.

6. The device that detects a state of thermal degradation of an exhaust purifying catalyst according to claim 1, further comprising a storage unit that is programmed to store in advance the rate of progress of thermal degradation corresponding to the degree of thermal degradation and the temperature of exhaust purifying catalyst; wherein the calculating unit is programmed to read a rate of progress of thermal degradation corresponding to the integrated value of rate of progress of thermal degradation at the immediately preceding time period and the temperature of the exhaust purifying catalyst at a present time period from the storage unit, and is programmed to add said rate of progress of thermal degradation over the present time period to the accumulated value of thermal degradation of the exhaust purifying catalyst at the immediately preceding time period.

7. The device that detects a state of thermal degradation of an exhaust purifying catalyst according to claim 6, wherein the determining unit is programmed to determine that the exhaust purifying catalyst is thermally degraded and defective, when the degree of thermal degradation calculated by the calculating unit is larger than a defect determining value.

8. The device that detects a state of thermal degradation of an exhaust purifying catalyst according to claim 1, wherein the determining unit is programmed to determine that the exhaust purifying catalyst is thermally degraded and defective, when the degree of thermal degradation calculated by the calculating unit is larger than a defect determining value.

9. The device for detecting a state of thermal degradation of an exhaust purifying catalyst according to claim 1, wherein the temperature of the exhaust purifying catalyst is estimated from the exhaust temperature and engine state of operation.

* * * * *